US006267547B1

(12) United States Patent
Lund

(10) Patent No.: US 6,267,547 B1
(45) Date of Patent: Jul. 31, 2001

(54) GRAPPLE ASSEMBLY

(76) Inventor: Erik J. Lund, P.O. Box 375, Belleville, MI (US) 48112-0375

( * ) Notice: Subject to any disclaimer, the term of this patent is extended or adjusted under 35 U.S.C. 154(b) by 0 days.

(21) Appl. No.: 09/410,521

(22) Filed: Oct. 1, 1999

Related U.S. Application Data

(60) Provisional application No. 60/102,899, filed on Oct. 2, 1998.

(51) Int. Cl.[7] ........................................ B60P 1/02

(52) U.S. Cl. .......................... 414/697; 414/724; 414/704; 414/739; 294/68.1; 294/6.21

(58) Field of Search ............................. 294/68.23, 68.21, 294/68.1, 111; 414/739, 704, 724, 715, 697, 685

(56) References Cited

U.S. PATENT DOCUMENTS

| | | | | |
|---|---|---|---|---|
| 2,652,939 | | 9/1953 | Burch . | |
| 2,798,627 | | 7/1957 | Kucera . | |
| 2,993,608 | | 7/1961 | Womble . | |
| 3,048,288 | | 8/1962 | Dwyer . | |
| 3,152,706 | * | 10/1964 | Conrad | 214/147 |
| 3,362,554 | | 1/1968 | Fortier . | |
| 3,384,409 | * | 5/1968 | Guinot | 294/80 |
| 3,595,416 | * | 7/1971 | Perrotti | 214/767 |
| 3,651,966 | | 3/1972 | Willett . | |
| 3,706,388 | | 12/1972 | Westendorf . | |
| 3,802,731 | | 4/1974 | La Bounty . | |
| 4,012,069 | | 3/1977 | Carson . | |
| 4,030,626 | * | 6/1977 | Durham | 214/767 |
| 4,125,952 | | 11/1978 | Jennings . | |
| 4,372,063 | * | 2/1983 | Work | 37/2 |
| 4,407,080 | | 10/1983 | Mann . | |
| 4,907,356 | | 3/1990 | Labounty . | |
| 4,928,410 | * | 5/1990 | Walters et al. | 37/117.5 |
| 5,150,936 | | 9/1992 | Avery . | |
| 5,209,536 | | 5/1993 | Rogers, Sr. et al. . | |
| 5,472,249 | * | 12/1995 | Fieldler | 294/2 |
| 5,564,885 | | 10/1996 | Staben, Jr. . | |

* cited by examiner

*Primary Examiner*—Joseph A. Fischetti
(74) *Attorney, Agent, or Firm*—John A. Waters; Waters & Morse, P.C.

(57) ABSTRACT

A grapple assembly that is particularly suited for use as an attachment to a skid steer loader comprises jaws that are no wider than the wheels of the loader and are lightweight and rigid. The grapple is operated by a single hydraulic drive cylinder that is inexpensive and easily replaceable. The lower jaw is L-shaped and formed of spaced vertical ribs having a bar extending across the tips of the ribs. The upper jaw of the grapple also has vertically spaced ribs which are interconnected by a bar adjacent the tips of the ribs. An intermediate bar reinforces the upper jaw and provides an attachment point for the drive cylinder at the center thereof.

11 Claims, 6 Drawing Sheets

GRAPPLE ASSEMBLY

CROSS-REFERENCES TO RELATED APPLICATION

This is a continuation of provisional U.S. patent application Ser. No. 60/102,899, filed Oct. 2, 1998, entitled Grapple Assembly, which is incorporated herein in its entirety by reference.

STATEMENT REGARDING FEDERALLY SPONSORED RESEARCH OR DEVELOPMENT

Not Applicable.

BACKGROUND OF THE INVENTION

There are a number of attachments for skid steer loaders that enable them to accomplish a number of functions. One attachment mechanism is a clamping mechanism known as a "grapple". A grapple is typically an hydraulically operated clamp which includes pivotal jaws extending across the front of the skids steer loader. Typically, a grapple is wider than the skid steer loader, so that the jaws protect the wheels of the loader against obstructions. In most such grapples the jaws are opened by a pair of spaced hydraulic cylinders. A problem with grapples of this nature is that they are expensive and sometimes are too wide when access space is limited. Also, a wide jaw constriction complicates picking up certain types of load.

An object of the present invention is to provide an improved grapple that fits through narrow openings and has improved jaw construction for picking up a variety of objects.

SUMMARY OF THE INVENTION

The present invention relates to a grapple assembly that is particularly suited for use as an attachment to a skid steer loader. The grapple is operated by a single hydraulic drive cylinder that is inexpensive and easily replaceable. The grapple jaws are narrower than the wheels of the loader and are lightweight and rigid. The lower jaw is formed of spaced vertical ribs having a bar extending across the tips of the ribs. This is lighter and stronger than a flat plate, which is commonly used. The bar at the ends of the tips improves rigidity and improves the clamping capabilities of the grapple. The upper jaw of the grapple also has vertically spaced ribs which are interconnected by a bar adjacent the tips of the ribs. An intermediate bar reinforces the upper jaw and provides an attachment point for the drive cylinder at the center thereof.

These and other features and advantages of the present invention are described in more detail in connection with the preferred embodiment of the present invention described below.

DETAILED DESCRIPTION OF THE PREFERRED EMBODIMENT

Figure 1:
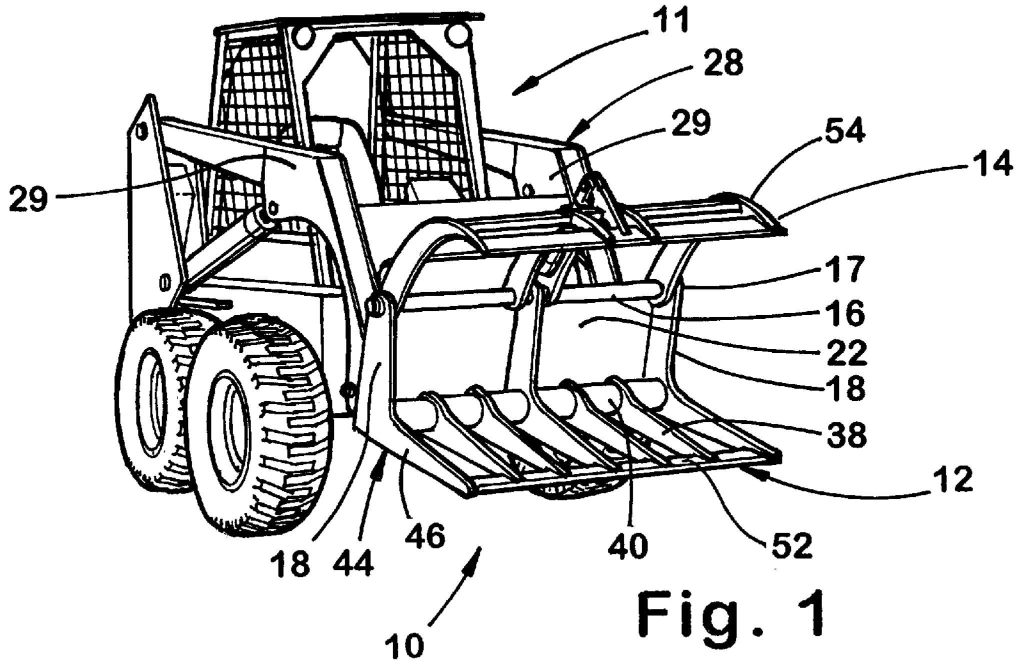
FIG. 1 is a front perspective view of skid steer loader employing a grapple assembly in accordance with the present invention, with the grapple assembly being shown in its open and raised position.
Figure 2:
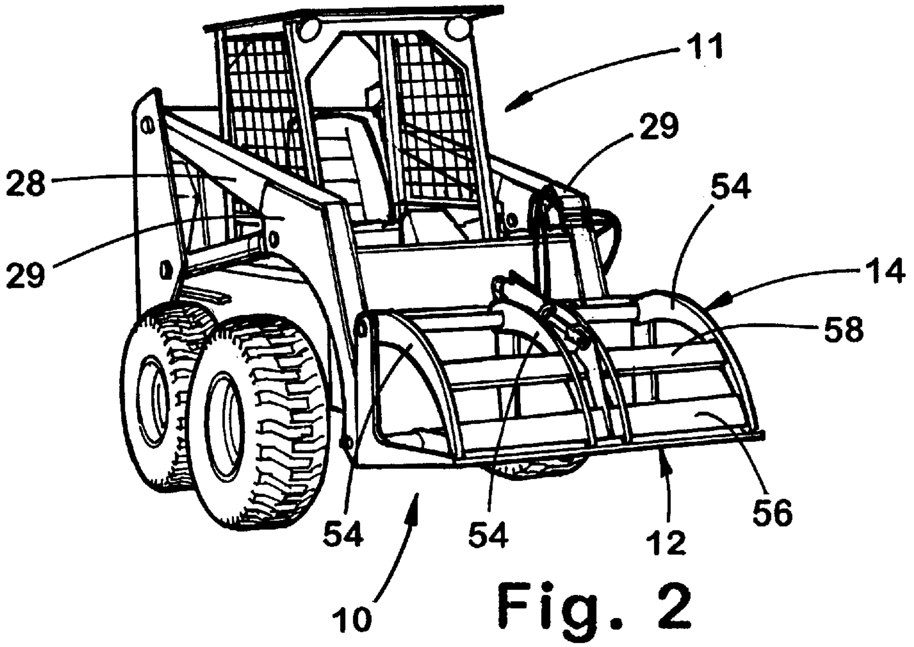
FIG. 2 is a perspective view as in FIG. 1 wherein the grapple assembly is closed.
Figure 3:
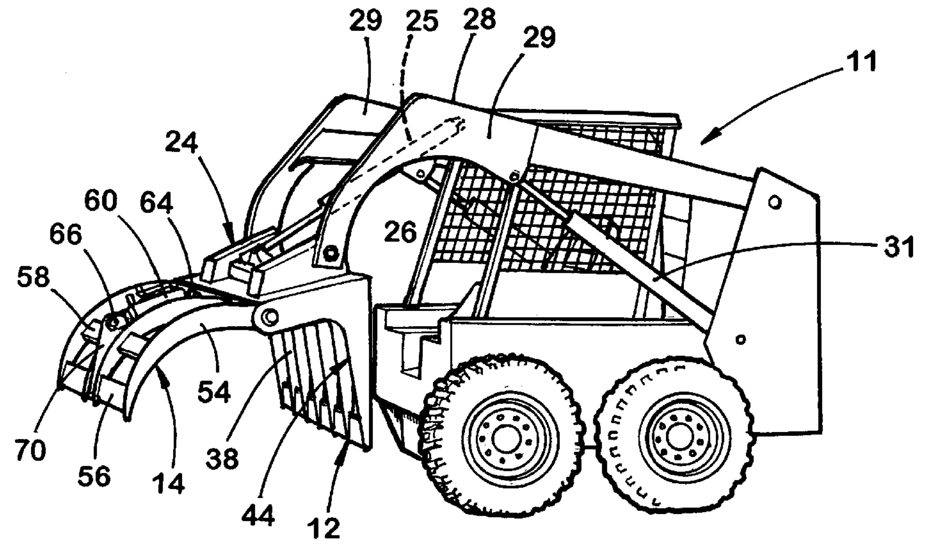
FIG. 3 is a perspective view of the skid steer loader and grapple assembly of FIG. 1 from the left front side thereof, showing the grapple assembly tilted and opened for picking up items on the ground.
Figure 4:
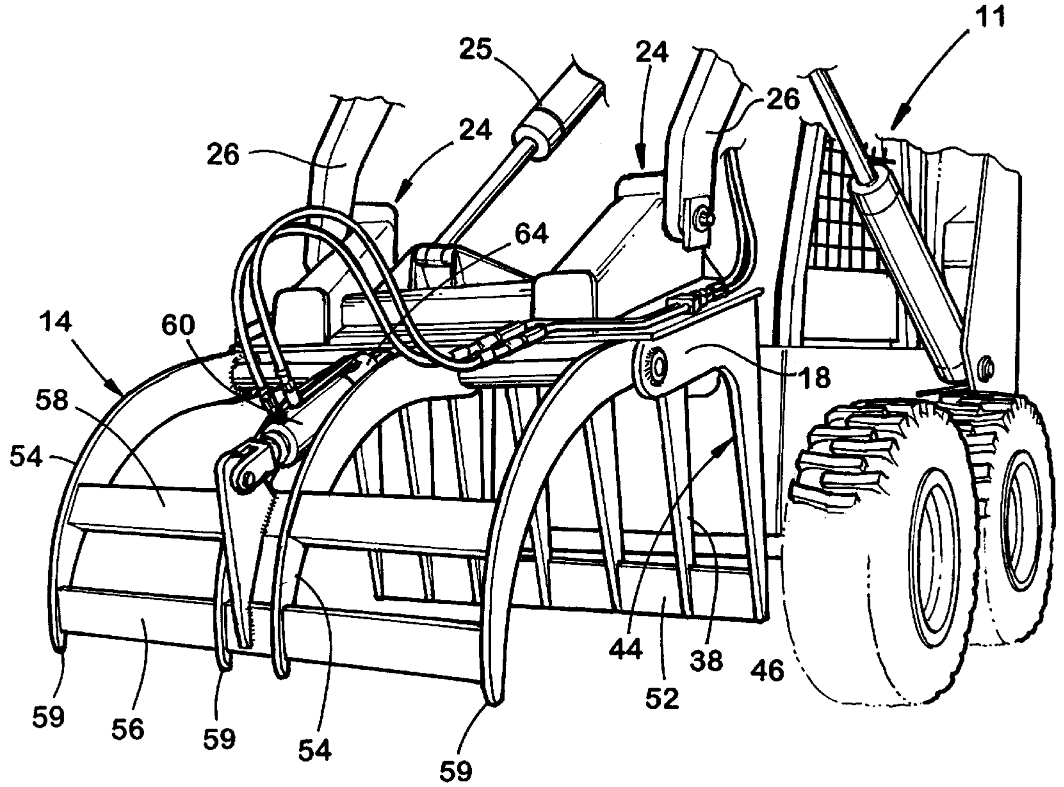
FIG. 4 is a partial perspective view of the apparatus of FIG. 3.
Figure 5:
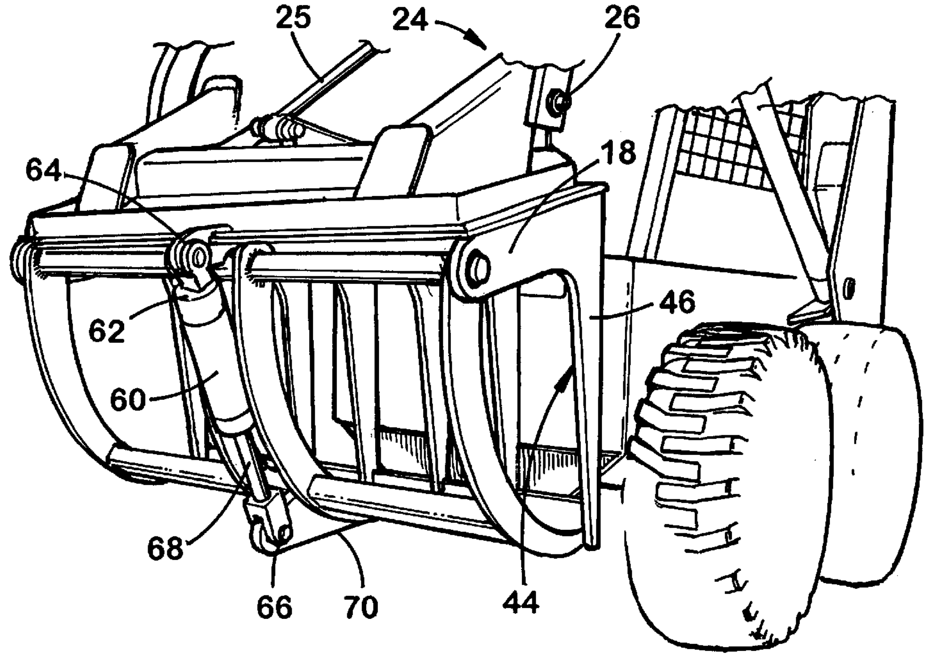
FIG. 5 is a partial perspective view of the apparatus of FIG. 3 showing the grapple in its closed position.
Figure 6:
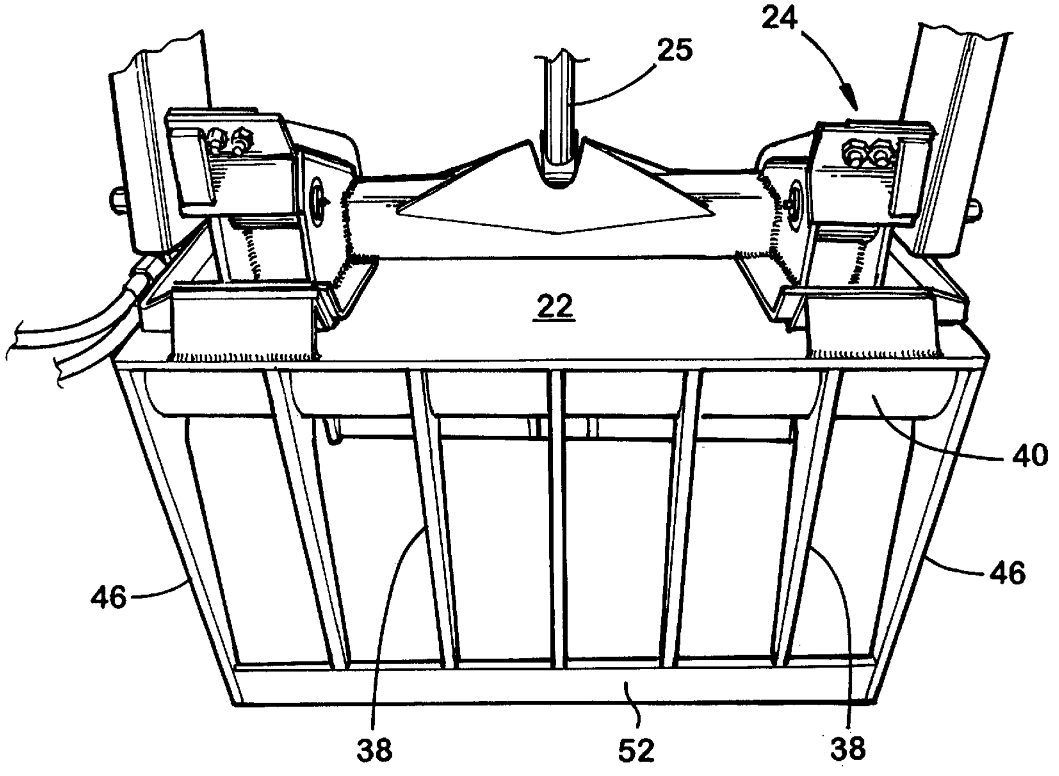
FIG. 6 is a rear view of the grapple apparatus of FIG. 5.

Referring to the drawings, a grapple attachment 10 constricted in accordance with the present invention is mounted on a skid steer loader 11 and is used to clamp and pick up a wide range of products.

The grapple attachment 10 comprises a lower jaw 12 and an upper jaw 14 pivotally connected together by means of an upper transverse shaft or hinge pin 16, which is mounted at the upper end 17 of upwardly extending legs 18 at an inner end of the lower jaw. The upper and lower jaws are mounted on a mounting plate 22 that is attached by a pivotal fitting 24 to distal or outer ends 26 of a loading arm mechanism 28 of the loader. This fitting can be a so-called "Fast Attach" brand mounting device which is commercially available. The fitting and thus the grapple is pivoted by a hydraulic drive 25, which is part of the loader. The loading arm mechanism comprises a pair of parallel spaced arms 29 that extend forwardly from the loader. These arms are raisable and lowerable by means of a hydraulic drive mechanism 31. The loader has an auxiliary hydraulic drive for supplying the hydraulics to drive the grapple of the present invention. The loader is conventional and does not form a part of the present invention.

Figure 7:
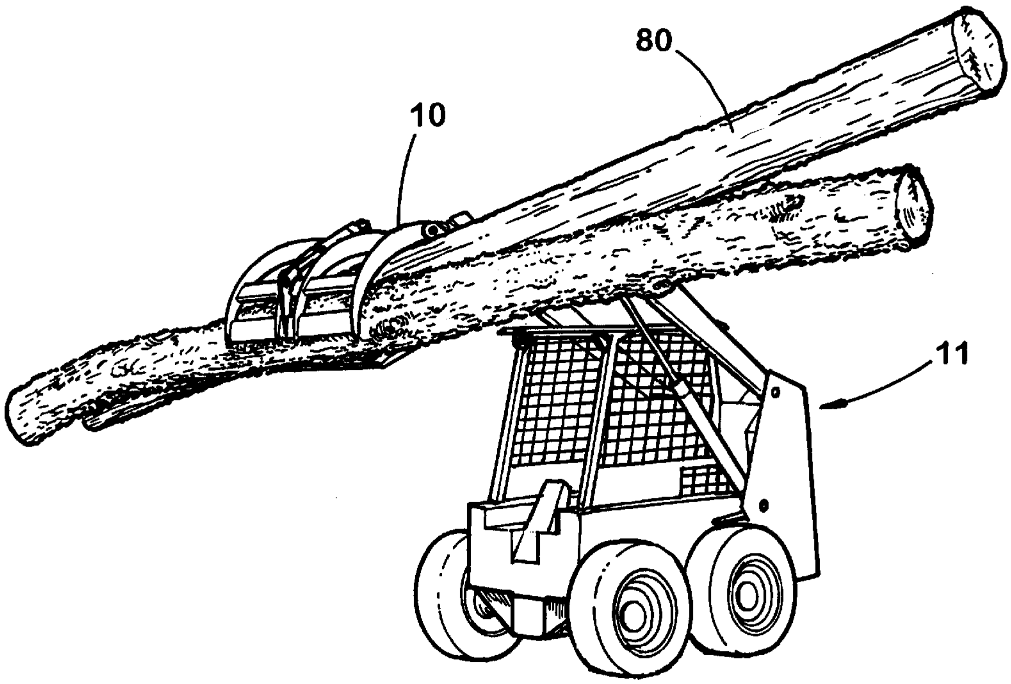
FIG. 7 is a perspective view showing the grapple apparatus being employed for picking up logs that are positioned transversely in the jaws of the grapple.
Figure 8:
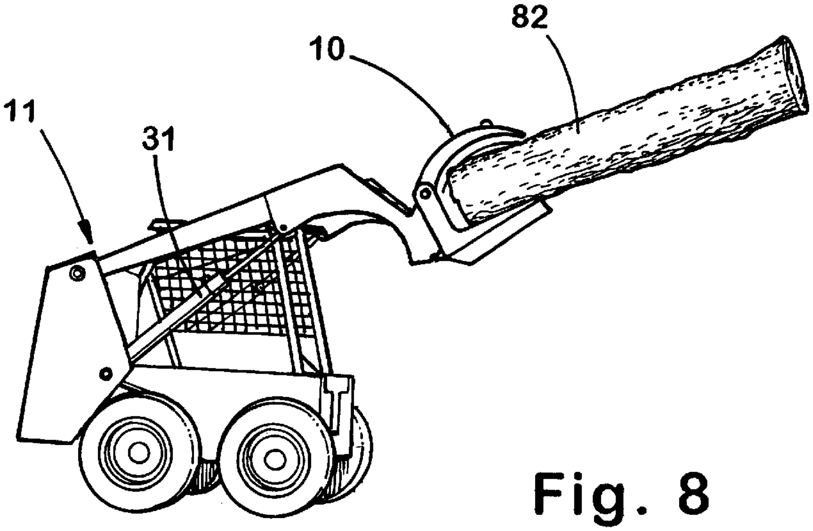
FIG. 8 is a perspective view showing the grapple apparatus picking up a log extending longitudinally from the front of the grapple apparatus.
Figure 9:
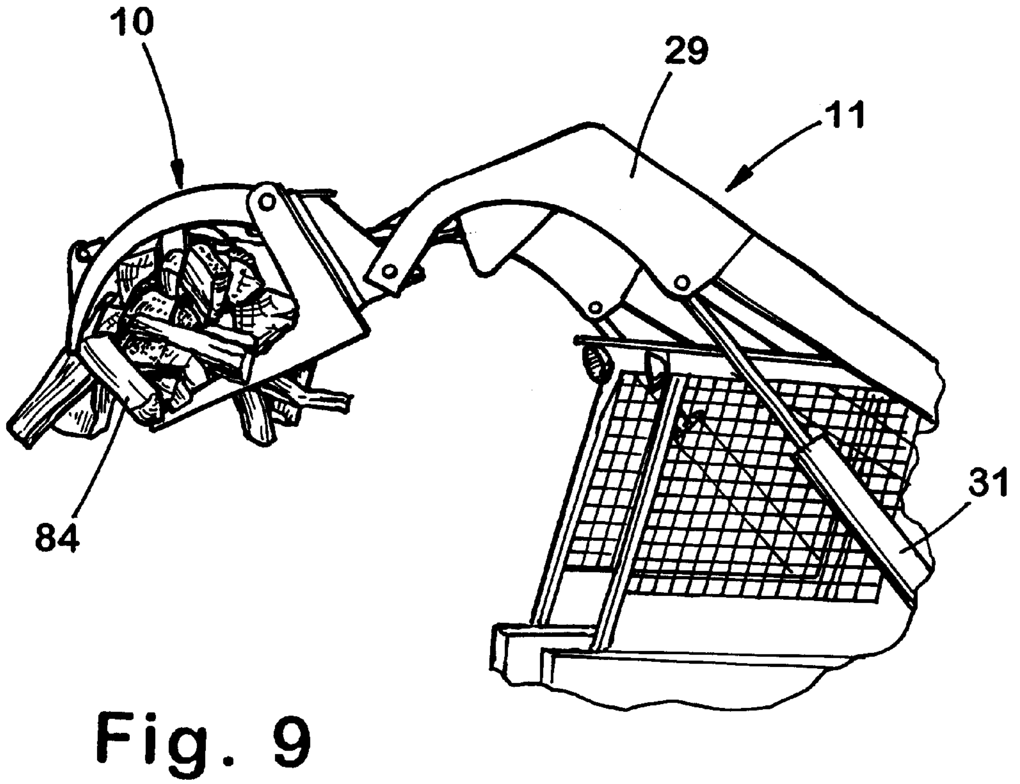
FIG. 9 is a perspective view showing the grapple apparatus picking up smaller materials, in this case a pile of scrap lumber or firewood.
Figure 10:
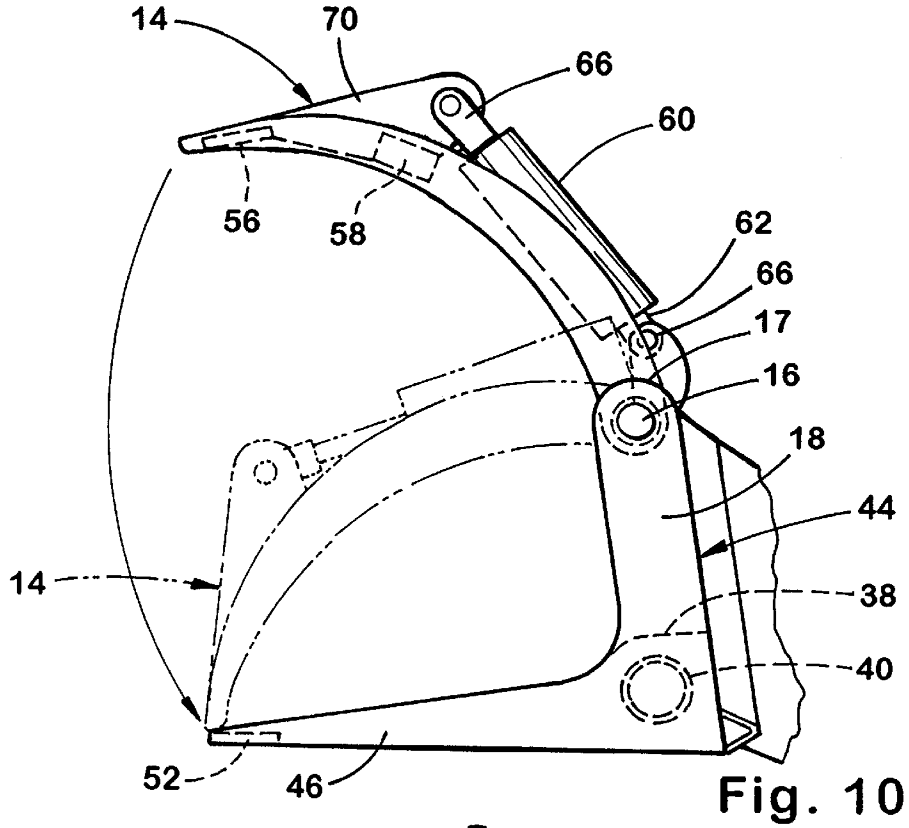
FIG. 10 is a side elevational view of the grapple attachment showing the open and closed positions of the jaws.

As shown in the drawings, an important feature of the present invention is that the grapple is somewhat narrower or at least no wider than the width of the loader. This makes it possible to use the grapple in any physical surroundings where the loader can fit, yet gives the grapple sufficient gripping power and torsional resistance to pick up a wide variety of unbalanced loads (see FIGS. 7–9). For example, long longs 80 can be carried transversely in the grapple (FIG. 7), and the jaws have sufficient gripping power to hold the logs horizontal. The grapple also has sufficient gripping force to lift a log 82 positioned longitudinally, as shown in FIG. 8. Finally, the jaws have the capability to pick up and hold a collection of smaller objects such as firewood or wood scrap 84 as shown in FIG. 9. The pick up bars on the outer edges of the jaws assist in picking up and clamping all such materials. A width of 46 inches is desirable when used with a conventional loader. This makes the grapple extend to the inside edge of the wheels. A grapple width of about 36 to about 82 inches (the width of the loader to the outer sides of the wheels) is satisfactory. The grapple is proportionally larger or smaller when used on a larger or smaller loader.

The lower jaw of the grapple comprises a plurality of transversely spaced vertically disposed ribs 38, which are mounted at inner ends to a transverse mounting tube 40. The mounting tube extends between L-shaped end plates 44 on the outer ends of the jaw. A lower leg 46 of the L-shaped end plates constitutes one of the ribs in the jaw. Upwardly extending leg 18 of L-shaped end plate 46 extends to an upper end 17, to which the upper jaw hinge pin 16 is mounted. The mounting plate 22 is attached to a rear side of upper legs 18. Desirably, the present invention comprises a third L-shaped member 50 positioned halfway between end plates 44 for additional structural rigidity.

An important feature of the present invention is that a pickup bar 52 is attached to the outer ends of ribs 38 and extends transversely across the entire width of the lower jaw. The pickup bar makes it possible to employ a lighter jaw by utilizing the improved strength of spaced ribs while at the same time benefiting from the improved pickup capabilities of a jaw having a flat plate across the front edge of the lower jaw. This also facilitates the use of the jaw for a scraping function without requiring a complete flat plate for the bottom jaw. The combination of the ribs and pickup bar make the jaws light and strong. The preferred grapple of the present invention weighs only about seven hundred pounds.

The upper jaw 14 comprises a plurality of spaced arcuate ribs 54 formed of vertical plates, with crossbars 56 and 58 interconnecting the ribs. One of the crossbars 56 forms a pickup bar at outer tips of the upper ribs leaving a short extension 59 of the ribs extending outwardly for improved pickup grip. Bar 56 mates with lower bar 52 for picking up objects.

Figure 11:
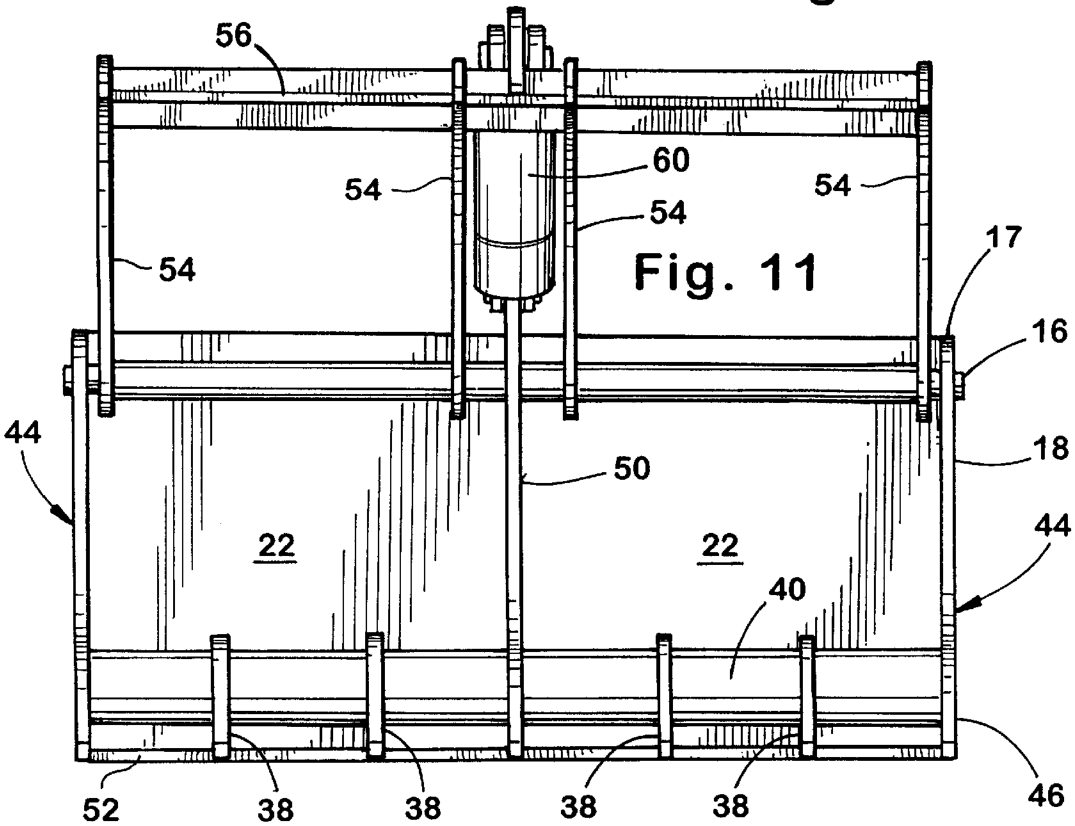
FIG. 11 is a front view of the grapple attachment of the present invention shown with the jaws open.

An important feature of the invention is that the grapple is operated by a single hydraulic cylinder 60 that is inexpensive and easy to replace. One end 62 of the hydraulic cylinder is mounted on a bracket 64 attached to mounting plate 22 and the other end of the cylinder (a fitting 66 at the outer end of piston shaft 68) is mounted on a bracket 70 attached to crossbars 56 and 58 at the center thereof. The hydraulic cylinder is supplied with hydraulic fluid by the auxiliary drive mechanism of the loader. The open and closed positions of the grapple are shown in FIG. 11 with the solid line figure of upper jaw 14 being shown in an open position and the phantom figure 14' representing the closed jaw position. The preferred cylinder is very inexpensive and easy to replace, and is available commercially from farm implement stores.

The size of the grapple of the present invention provides a number of advantages. With a conventional wide grapple (which typically extends outwardly beyond the tires of the vehicle) two hydraulic drive cylinders are necessary to operate the jaws, and the jaws cannot effectively pick up smaller objects or objects in narrow places. With the present invention, the jaws can fit into relatively narrow places and pick up a much wider variety of things than the wider jaws. Moreover, the jaws are sufficiently wide to pick up long objects and resist torsion on the jaws.

It should be understood that the foregoing is merely exemplary of the preferred practice of the present invention and that various changes and modifications may be made in the embodiments disclosed herein without departing from the spirit and scope of the present invention.

I claim:

1. A grapple for a loader that includes a lift mechanism for raising the grapple from a lowered position, wherein the grapple abuts the ground, to a raised position, wherein the grapple is positioned above the ground, the grapple comprising:

a lower jaw that abuts the ground when the grapple is in its lowered position, the lower jaw being no wider than the width of the loader to which it is attached, the lower jaw having an L-shaped configuration with a generally flat lower portion and generally upright rear portion, the rear portion being attachable to the lift mechanism, the lower portion comprising a plurality of spaced ribs each of a length ending in an outer end, each said lower jaw rib being mounted on a transverse member at the rear portion and extending outwardly to an outer end of the lower portion, with the space between the ribs being substantially open, the lower portion further including a bar that is mounted to the outer ends of the lower jaw ribs and extends transversely across the lower portion to define the outer end thereof;

an upper jaw pivotally mounted on an upper end of the generally upright rear portion of the lower jaw for movement between open and closed positions, the upper jaw being no wider than the width of the loader and extending outwardly and downwardly from the upper end of the lower jaw, the upper jaw comprising laterally spaced ribs each attached at a rear end thereof to the upper end of the generally upright rear portion of the lower jaw for pivotal movement between open and closed positions, each upper jaw rib being of a length ending in an outer end, with the space between the upper jaw ribs being substantially open, the upper jaw having a transverse bar extending across the outer ends of the ribs thereof, the lengths of the upper and lower jaw ribs being sized such that the transverse bars of the upper and lower jaws are parallel and are adjacent each other when the jaws are closed, providing opposing continuous surfaces for clamping materials therebetween, the spaced upper and lower jaw ribs providing strength and rigidity and a gripping surface without excess weight; and a single hydraulic cylinder drivingly connected to the upper jaw for opening and closing the upper and lower jaws.

2. A grapple attachment according to claim 1 wherein the grapple attachment includes pivotal mounting means on a rear side thereof for attachment to the lifting mechanism of a skid steer loader, the pivotal mounting means permitting the grapple assembly to be pivoted between a first position and a second position, the first position being a position wherein the lower portion of the lower jaw is generally parallel to the ground so that the lower portion of the jaw can lie flat against the ground and pick materials up by scraping on the ground, the second position being a position wherein the lower portion of the lower jaw is generally perpendicular to the ground such that the grapple can be used for picking things up by clamping them between the jaws.

3. A grapple attachment according to claim 1 wherein the grapple assembly is no more than about 82 inches wide.

4. A grapple attachment according to claim 1 wherein the grapple assembly is no more than about 46 inches wide.

5. A grapple attachment according to claim 1 wherein the upper jaw includes a second transverse bar attached to the ribs thereof, the second bar being positioned between the front and rear ends of the upper jaw ribs and provides further reinforcement of the upper jaw ribs.

6. A grapple attachment according to claim 1 wherein the lower jaw comprises L-shaped end plates mounted on the ends of a transverse mounting tube at corners of the end plates, the ribs of the lower jaw including spaced vertically disposed plates that are positioned between the end plates and attached at rear ends to the mounting tubes, the lower jaw ribs tapering downwardly toward outer ends of the lower jaw ribs, the transverse bar at the outer end of the lower jaw being a generally flat plate mounted at the outer ends of the lower jaw ribs.

7. A grapple attachment according to claim 1 wherein the bars at the ends of the ribs are elongated flat plates, the plates abutting when the jaws are closed such that the plate on the upper jaw is generally perpendicular to the plate on the lower jaw when the jaws are closed, thus providing a pick up mechanism wherein a narrow edge on the upper jaw is clamped against a flat plate on the lower jaw.

8. A grapple attachment according to claim 1 wherein the hydraulic cylinder is transversely centered on the grapple and the grapple includes only one hydraulic cylinder for opening and closing the jaws.

9. A grapple according to claim 8 wherein the grapple has a width that is no greater than the distance between inside surfaces of front tires of a skid steer loader on which the grapple is designed to be attached, such that the grapple can fit through openings more narrow than the skid steer loader.

10. A loader having a removable grapple attachment mounted thereon, the loader comprising a vehicle having a pair of powered lift arms that extend to outer ends positioned in front of the vehicle, the outer ends being positioned inside outer sides of the vehicle, the grapple attachment comprising:

upper and lower jaws pivotally mounted together, with one of said upper and lower jaws further being pivotally mounted on the outer ends of the lift arms;

the lower jaw being L-shaped and having a generally flat lower portion and a generally upright rear portion, the lower jaw having a tubular cross member at a junction between the rear and lower portions, the lower portion comprising a plurality of narrow, spaced ribs having rear ends mounted on the tubular cross member and tapering in height outwardly to outer ends, the lengths of said tower jaw ribs being defined by said outer ends, with the space between the lower jaw ribs being substantially open, the lower portion further including a relatively narrow bar extending across the outer ends of the lower jaw ribs;

the upper jaw comprising a plurality of spaced upper jaw ribs, each having a length defined by an outer end, with the jaw being substantially open between the upper jaw ribs, the upper jaw including a bar extending across outer ends of the upper jaw ribs, the lengths of the upper and lower jaw ribs being sized such that the bars of the upper and lower jaws are parallel to each other and are disposed adjacent each other when the upper and lower jaws are closed so as to provide a continuous lateral gripping surface on each jaw, while leaving the ribs uncovered and in position to engage objects picked up by the grapple; and an actuator mechanism drivingly connected to at least one of the upper and lower jaws to open and close the upper and lower jaws and pivot the upper and lower jaws on the outer ends of the lift arms.

11. A skid steer loader according to claim 10 wherein one and only one centered hydraulic cylinder is connected to the jaws for opening and closing the jaws.

* * * * *